United States Patent
Laot et al.

(10) Patent No.: US 7,561,647 B2
(45) Date of Patent: Jul. 14, 2009

(54) EQUALISING AND DECODING DEVICE FOR FREQUENCY-SELECTIVE CHANNELS

(75) Inventors: Christophe Laot, Plougonvelin (FR); Joel Labat, Plougastel Daoulas (FR)

(73) Assignees: France Telecom, Paris (FR); Groupe des Eccles des Telecommunications (Enst Brentagne), Paris (FR)

(*) Notice: Subject to any disclaimer, the term of this patent is extended or adjusted under 35 U.S.C. 154(b) by 1141 days.

(21) Appl. No.: 10/471,139

(22) PCT Filed: Mar. 5, 2002

(86) PCT No.: PCT/FR02/00783

§ 371 (c)(1),
(2), (4) Date: Sep. 4, 2003

(87) PCT Pub. No.: WO02/071712

PCT Pub. Date: Sep. 12, 2002

(65) Prior Publication Data

US 2004/0120432 A1 Jun. 24, 2004

(30) Foreign Application Priority Data

Mar. 6, 2001 (FR) .................................. 01 03012

(51) Int. Cl.
*H04B 1/10* (2006.01)
(52) U.S. Cl. ...................................... 375/350; 375/232
(58) Field of Classification Search ................. 375/350, 375/229, 230, 232; 708/300–323, 819; 333/18, 333/28
See application file for complete search history.

(56) References Cited

U.S. PATENT DOCUMENTS

| 5,453,797 | A  | * | 9/1995  | Nicolas et al. | .............. | 348/607 |
| 6,243,415 | B1 | * | 6/2001  | Pipon et al.   | ................. | 375/232 |
| 6,307,901 | B1 | * | 10/2001 | Yu et al.      | ..................... | 375/341 |

(Continued)

FOREIGN PATENT DOCUMENTS

EP    0 959 580 A1    11/1999

(Continued)

OTHER PUBLICATIONS

Trellis-Coded OFDM Signal Detection with Maximal Ratio Combining and Combined Equalization and Trellis Decoding, Seong Sik Lee, et al, IEICE Trans Commun, vol. E80-B, No. 4, Apr. 1, 1997, pp. 632-638.

*Primary Examiner*—Shuwang Liu
*Assistant Examiner*—David Huang
(74) *Attorney, Agent, or Firm*—Blakely, Sokoloff, Taylor & Zafman LLP

(57) ABSTRACT

The invention relates to a channel equalizing and decoding device consisting of a series of modules, each of which comprises an equalizer (10) and a decoder with weighted output (20). The modules of rank higher than 1 receive (i) a sequence of samples coming from a sensor and delayed by a value equal to the processing time of preceding modules and (ii) the output from the preceding module. Said invention is characterized in that each of the modules comprises means for receiving at least two different sequences of samples and an equalizer that can determine one same equalized sequence of samples using the aforementioned minimum two sequences received as two different non-equalized representations of the sequence of samples to be determined.

10 Claims, 4 Drawing Sheets

U.S. PATENT DOCUMENTS

| | | | |
|---|---|---|---|
| 6,690,723 B1 * | 2/2004 | Gosse et al. | 375/233 |
| 7,012,957 B2 * | 3/2006 | Allpress et al. | 375/233 |
| 2001/0017904 A1 * | 8/2001 | Pukkila et al. | 375/350 |
| 2002/0099985 A1 * | 7/2002 | Cheng | 714/704 |

FOREIGN PATENT DOCUMENTS

| | | |
|---|---|---|
| FR | 9105279 | 10/1992 |
| FR | 95 01603 | 2/1995 |
| FR | 2 730 370 A1 | 8/1996 |
| FR | 2 763 454 A1 | 11/1998 |

\* cited by examiner

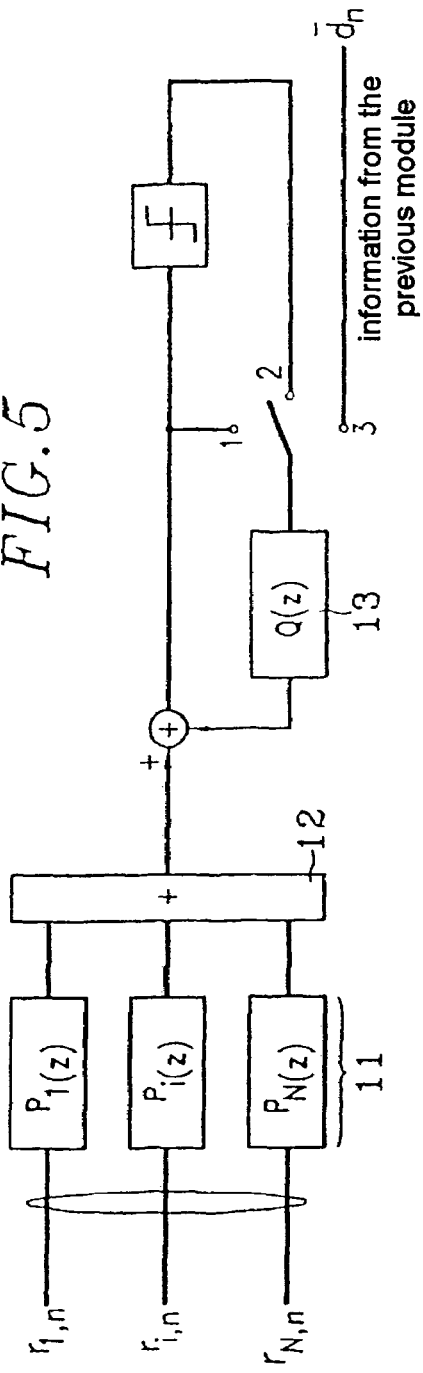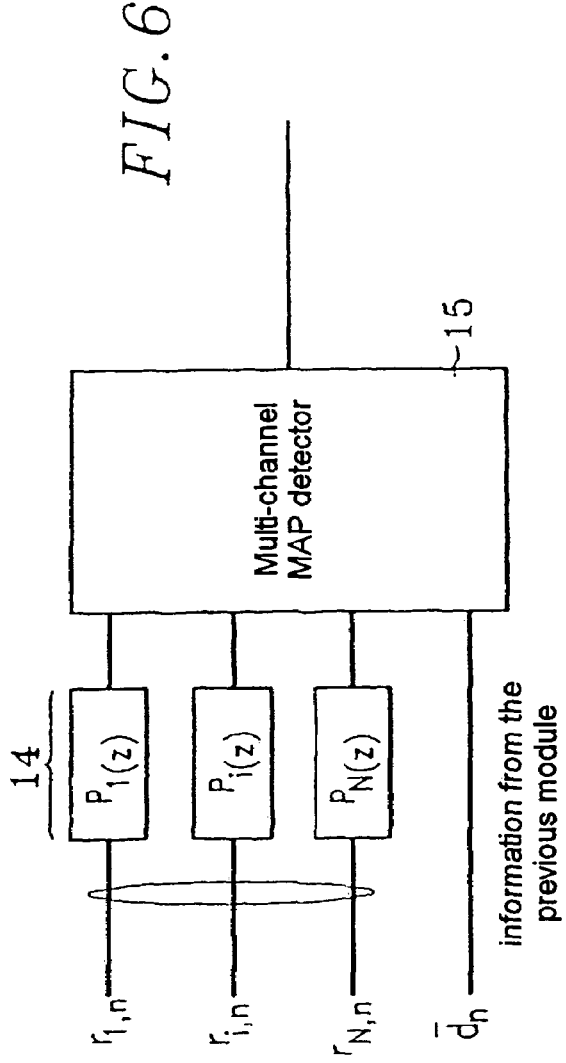

EQUALISING AND DECODING DEVICE FOR FREQUENCY-SELECTIVE CHANNELS

The present patent application is a non-provisional application of International Application No. PCT/FR02/00783, filed Mar. 5, 2002.

BACKGROUND OF THE INVENTION

1. Field of the Invention

The present invention relates to a channel equalization and decoding device for frequency selective channels.

2. Description of Related Art

In digital transmission, the solutions proposed generally use channel equalization and coding processes. In the conventional approach, the elementary channel equalization and coding functions are processed separately, utilizing only part of the information placed at their disposal. Therefore, the overall performance of the receiver remains suboptimal.

An aim of the invention is to remedy this drawback.

For a few years now, several authors prompted by the techniques of turbo-codes [1] have proposed solutions based on a maximum likelihood detector, an interference canceller and channel coding to combat interference between symbols. Among these solutions let us briefly recall the most significant contributions.

In 1995, a receiver called a turbo-detector [2] associated a detector based on maximum a posteriori likelihood with a channel decoder, through an iterative procedure. The performance obtained was then quasi-optimal for many channels. However, the turbo-detector remained reserved rather for modulations with a small number of states and for channels having short impulse responses.

In 1997, another turbo-equalizer receiver [3] was devised with the aim of being able to reduce the complexity of the turbo-detector and of being able to quasi-optimally equalize modulations with a large number of states on channels exhibiting considerable spreading with respect to the symbol duration.

An aim of the invention is to improve the performance of both of the aforementioned receivers.

BRIEF SUMMARY OF THE INVENTION

To do this, a device according to the invention is a channel equalization and decoding device comprising a series of modules which each comprise an equalizer and a decoder with weighted outputs, and whose modules of rank greater than 1 receive, on the one hand, a string of samples emanating from a sensor and delayed by a quantity equal to the processing time of the previous modules, and, on the other hand, the output of the previous module, characterized in that the modules each comprise means of reception of at least two strings of different samples and an equalizer able to determine one and the same equalized string of samples by utilizing these at least two strings received as two unequalized different representations of the string of samples to be determined.

The invention uses the spatial and/or temporal diversity provided by an antenna possessing several sensors (multi-channel receivers) from which sensors there typically emanate respectively the two strings of samples forming the two different representations. The invention differs from the contributions [4-8] through its multi-channel processing of the information received and/or the possibility of using modulations with a large number of states for transmissions with considerable temporal spreading.

In this way, spatial and/or temporal diversity of reception which markedly improves the results obtained is utilized.

A multi-channel signal is equalized and one and the same block of received data is decoded repeatedly using the information provided by the previous processing.

BRIEF DESCRIPTION OF THE DRAWINGS

Other characteristics, aims and advantages of the invention will become apparent on reading the detailed description which follows, given with reference to the appended figures in which:

FIG. 5 diagrammatically represents an embodiment of a multi-channel equalizer according to the invention;

FIG. 6 diagrammatically represents another possibility for the embodiment of a multi-channel equalizer according to the invention;

DETAILED DESCRIPTION OF THE INVENTION

Figure 1A:
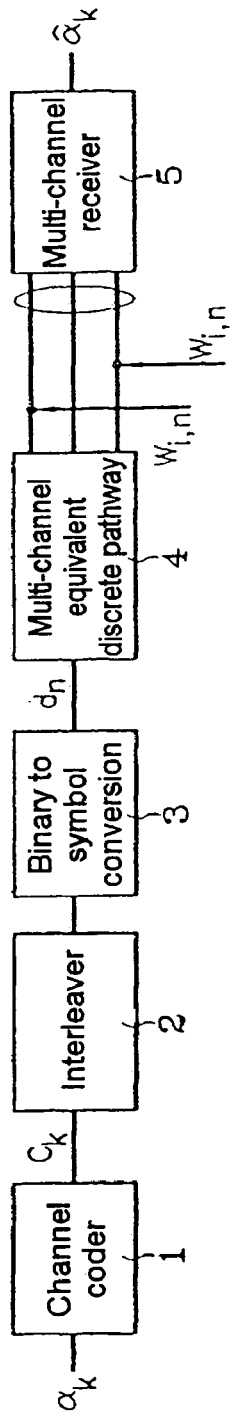
FIG. 1a represents a transmission chain of bit-interleaver type.
Figure 1B:
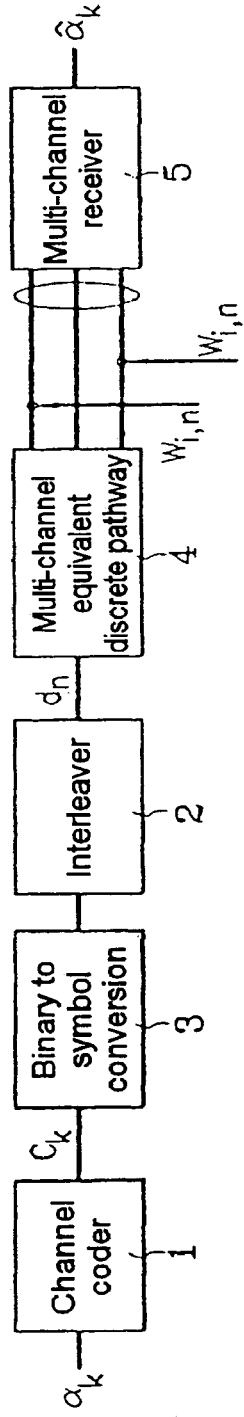
FIG. 1b represents a transmission chain of symbol-interleaver type.
Figure 2:
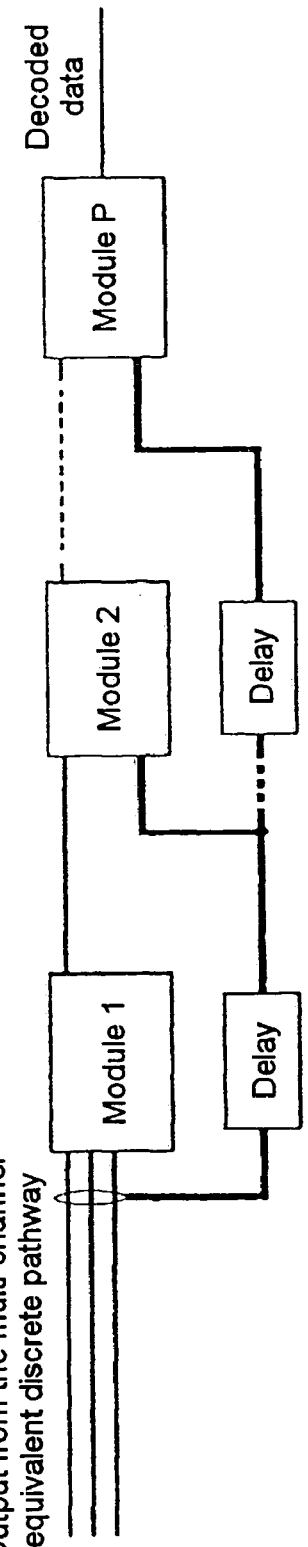
FIG. 2 diagrammatically illustrates an iterative structure of a multi-channel equalization and channel decoding device in accordance with a possible embodiment of the invention.

Illustrated in FIGS. 1a and 1b is the principle of a data transmission chain. A channel coder 1 is fed with mutually independent binary data $\alpha_k$ uniformly distributed over the set $\{0; 1\}$, at a rate of one data item every $T_b$ seconds. The data leaving the channel coder 1 are transposed onto the set $\{-1; 1\}$ and denoted $c_k$.

Each passage of a set of 2m coded data $C_k$ through the interleaver referenced 2 and through the binary to symbol converter (BSC) referenced 3 generates a complex symbol $d_n = a_n + jb_n$ of variance $\sigma^2_d$. The symbols $a_n$ and $b_n$ take their values in the alphabet $\{\pm 1 \ldots, \pm(2p+1), \ldots, \pm(\sqrt{M}-1)\}$ with $\sqrt{M}=2^m$. This operation can, without loss of generality, integrate the techniques of trellis-coded modulation, of differential coding or any other system making it possible to associate a modulation symbol with a set of binary elements. The transmission chains depicted in FIGS. 1a and 1b differ regarding the location of an interleaver 2 which can be placed respectively upstream (bit interleaver) or downstream (symbol interleaver) of the BSC referenced 3. The modulation symbols, denoted dn, are then presented to the input of a modulator on two quadrature carriers.

The assembly consisting of modulator, transmission medium, demodulators, and transmit and receive filters is modeled by a multi-channel equivalent discrete pathway 4, where each channel i, i=1, . . . , N, is disturbed by centered, Gaussian additive noise $w_{i,n}$ of variance $\sigma_i^2$. The output of each channel is equal to:

$$r_{i,n} = \sum_{l=0}^{Li} h_{i,l} d_{n-l} + w_{i,n} \quad (1)$$

where the $h_{i,1}$ are the coefficients of the pathway corresponding to channel i and such that the transfer function associated with this channel may be written:

$$H_i(z) = \sum_{l=0}^{L_i} h_{i,l} z^{-l} \quad (2)$$

The coefficients of the pathways of the various channels are assumed to be normalized in such a way that the signal received at the level of the receiver, here denoted 5, is of unit power:

$$\sum_{i=1}^{N} \rho_i = 1 \text{ with } \rho_i = \sum_{l=0}^{L_i} |h_{i,l}|^2 \quad (3)$$

Considering the noise $w_{i,n}$ to be mutually uncorrelated, the variance of the noise seen by a receiver referenced 5 is equal to:

$$\sigma_{noise}^2 = \sum_{i=1}^{N} \sigma_i^2 \quad (4)$$

The signal-to-noise ratio (SNR) at the input of the turbo-equalizer is equal to:

$$SNR = \frac{\sigma_d^2}{\sigma_{noise}^2} = R \frac{E_b}{N_0} \log_2(M) \quad (5)$$

where $E_b$ is the mean energy received per data item transmitted, $N_0$ the spectral power density of the noise at the input of the receiver 5 and R the rate of the channel coder 1.

Figure 3:
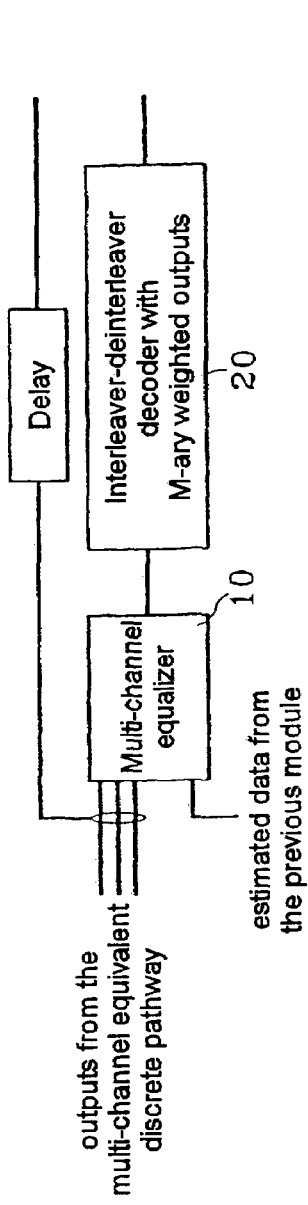
FIG. 3 diagrammatically represents a possible structure of a receiver module according to the invention.

In what follows, an elementary processing of an information block will be referred to as a module. As represented in FIG. 3, each module p(p=1, . . . , P) comprises a multi-channel equalizer 10 (in particular an equalizer able to utilize the signals picked up simultaneously by several sensors in parallel), and a channel decoder 20 integrating the interleaving and deinterleaving functions. The multi-channel equalizer 10 of the modules of rank greater than 1 must be able to utilize the estimated data provided by the channel decoder of the lower-rank modules.

Figure 4A:
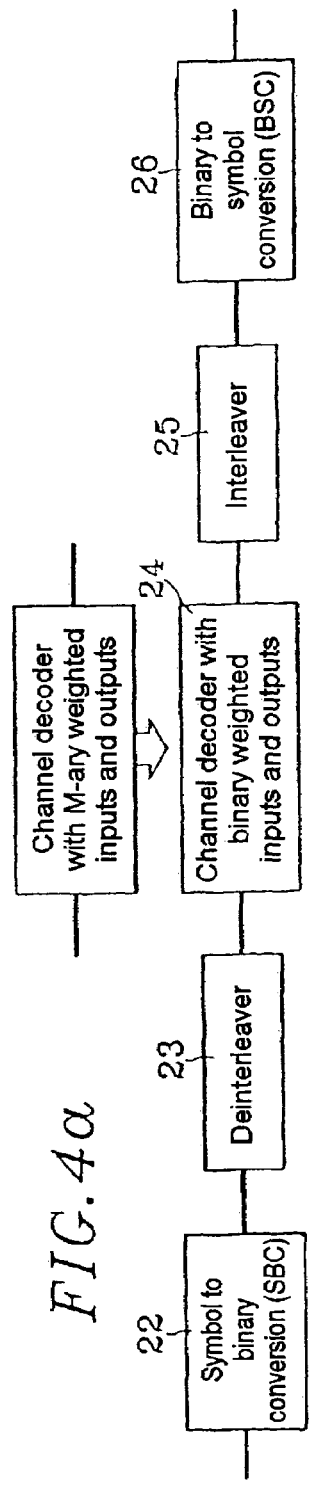
FIG. 4a diagrammatically represents a possible decomposition of a channel decoder with M-ary weighted output and input, used in an embodiment of the invention, in particular in respect of transmissions with multistate modulations in the case of a bit-interleaver.
Figure 4B:
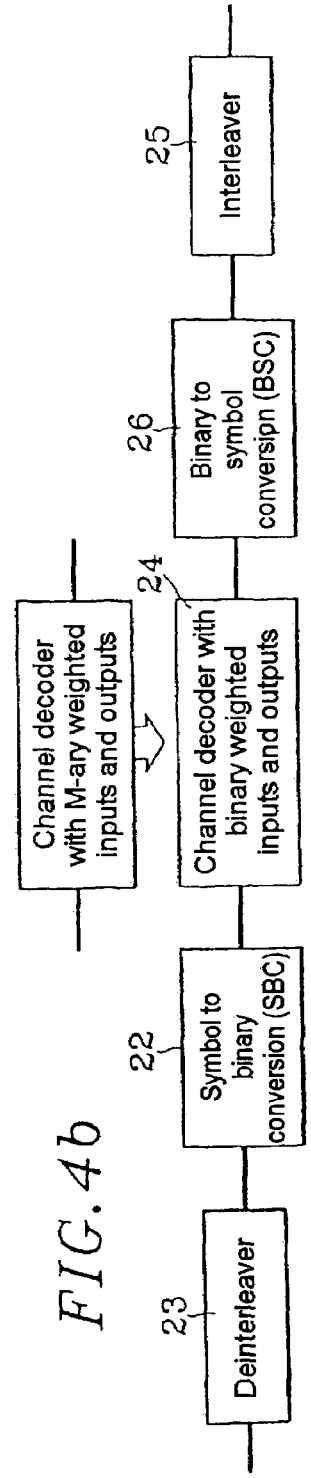
FIG. 4b diagrammatically represents a possible decomposition of a channel decoder with M-ary weighted output and input, used in an embodiment of the invention, in particular in respect of transmissions with multistate modulations in the case of a symbol-interleaver.

In the case of multistate modulations, the channel decoder 20 can be split into five distinct elements (FIGS. 4a and 4b), i.e. a symbol to binary converter (SBC) 22, a deinterleaver 23, a channel decoder with binary weighted input and output 24, an interleaver 25 and a binary to symbol converter (BSC) 26. The site of the interleaver is located downstream or upstream of the SBC 22 and reciprocally for the BSC 26 in accordance with the transmit diagram.

In what follows, we shall present two embodiments. One, called a multi-channel turbo-equalizer (MCTE), is composed of simple digital filters and the other, called a multi-channel turbo-detector (MCTD), associates digital filters and a maximum a posteriori likelihood detector with multiple inputs.

The structure of the multi-channel equalizer according to the first variant (MCTE), represented in FIG. 5, comprises a bank of filters 11 comprising as many filters as there are reception channels. An adder 12 then sums the set of outputs from the bank of filters 11. The output from a filter Q, referenced 13, fed either with the decided data of the iteration in progress, or with the estimated data obtained from the previous module, is then subtracted from this signal.

For the module of rank 1, the transverse filter Q is fed either with the output from the equalizer of this same module, or with decided data at the output of the equalizer of this same module. The transverse filter Q is fed with the output from the previous module, and advantageously either with the output from the equalizer of this same module, or with decided data at the output of the equalizer of this same module for the module of rank 1.

This last filter 13 makes it possible to reconstruct some or all of the inter-symbol interference present at the output of the adder 12 in a manner similar to the teaching of FR 2 763 454.

To describe the device, we have considered an PM2 modulation and a fixed number N=2 of channels. The transmission pathways are such that the powers of the signal and of the noise are identical on each channel. For the first module (p=1), the linear equalizer optimal in the mean square error sense can then be embodied, apart from by the filter Q, by two transverse filters with transfer function $P_i(Z)$ and a summator.

$$P_i(z) = \frac{H_i^*(1/z^*)\sigma_d^2}{(H_1(z)H_1^*(1/z^*) + H_2(z)H_2^*(1/z^*))\sigma_d^2 + \sigma_{noise}^2} \quad i=1,2; p=1 \quad (6)$$

with $H_1 = h_{1,1}; h_{1,2}; \ldots h_{1,L1}$ and $H_2 = h_{2,1}; h_{2,2}; \ldots; h_{2,L2}$.

These filters are generally embodied in transverse form, but may equally well be embodied by cascading a transverse filter and a recursive filter. It is also entirely possible to use a simple matched filter or else a decision feedback nonlinear equalizer.

The output of the multi-channel equalizer 10 feeds the input of the channel decoder 20 with weighted inputs and outputs. The output from the channel decoder 20 provides the estimated data that will be used by the next module to feed a filter Q(z) referenced 13. The iterative procedure is then instigated and can continue. When the number of iterations is sufficient and the MCTE has operated correctly, then the transfer functions of the filters $P_i(z)$ and Q(z) are close or equal to:

$$P_i(z) = H_i^*(1/z^*) \ i=1,2; p>1 \quad (7)$$

The number of coefficients of these filters is finite. These filters are $$Q(z) = H_1 H_1^*(1/z^*) + H_2(z) H_2^*(1/z^*) - 1 \ p>1 \quad (8)$$

embodied in transverse form.

The manner in which the coefficients of the filters $P_1$, $P_2$ and Q of the equalizers are determined in practice as well as the manner in which the weighted outputs of the channel decoder 20 are obtained can be those set forth in FR 2 763 454.

To illustrate the manner of operation of the MCTE, we have considered two highly frequency-selective channels whose non-normalized discrete impulse responses are equal to:

$H_1$=[0.38 0.6 0.6 0.38]

$H_2$=[0.8264 −0.1653 0.8512 0.1636 0.81]

The coefficients of the filters are calculated from relations (6), (7), and (8), assuming that the coefficients of $H_1$ and $H_2$ are known. For the simulations, the transmission chain depicted in FIG. 1b has been considered together with an interleaving of size 256×256 and the transmitting of more than 1 million binary elements. Channel coding is carried out by a rate ½ convolutional coder with octal generating polynomials (23, 35).

Figure 7:
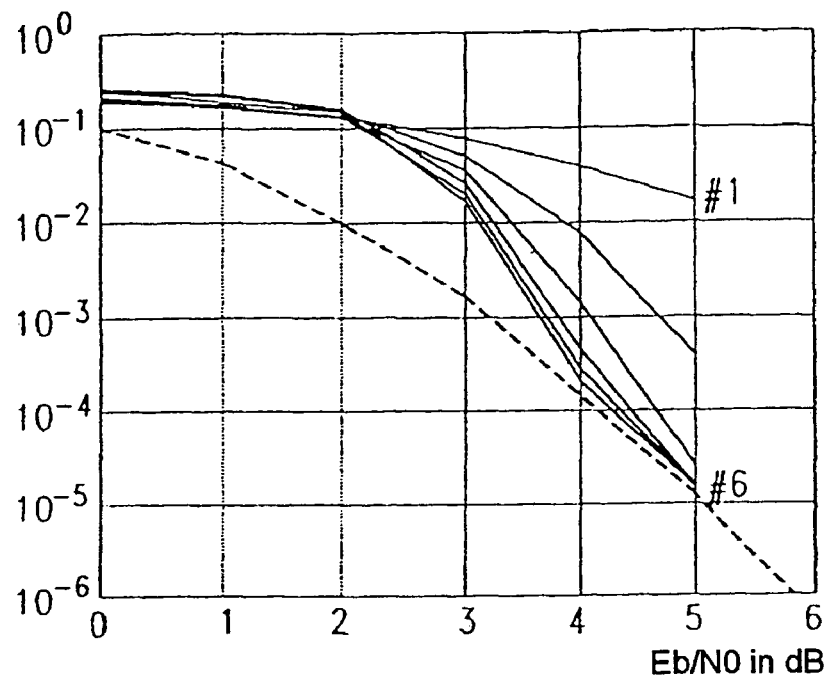
FIG. 7 is a graph which gives the binary error rate after channel decoding as a function of a ratio Eb/N0 and which illustrates performance of a device of the type of that represented in FIGS. 2, 3, and 5 for an PM2 modulation on a multi-channel pathway.

The performance of the MCTE is represented in FIG. 7. The dashed curve represents the performance obtained on the frequency unselective Gaussian channel with coding and the solid curves the performance obtained at the output of the MCTE for various iterations.

These results show that the MCTE is very efficient in combating inter-symbol interference and rivals the performance of the frequency unselective Gaussian channel when the signal-to-noise ratio exceeds a few dB.

A second embodiment, which is a receiver based on the use of a multi-channel detector, will now be described.

The structure of the multi-channel detector of the MCTE, represented in FIG. 6, comprises a bank of filters 14 comprising as many filters as there are reception channels. The outputs from the bank of filters 14 as well as the estimated data of a previous module feed the input of a multi-channel MAP detector 15 based on maximum a posteriori likelihood (detector with weighted outputs).

The weighted output of the detector 15 is deduced from a likelihood ratio logarithm calculation. An intrinsic value can be obtained by subtracting the previous module's estimated data, weighted by a coefficient, from the output of the detector 15.

It should be pointed out that, for the module of rank 1, the estimated data provided by the previous module are not known. They will be taken equal to zero, their reliability being considered to be nil.

To describe this device, we have considered an PM2 modulation and a fixed number N=2 of channels. The transmission pathways are such that the powers of the signal and of the noise are identical on each channel. We have also assumed that the filters 14 preceding the detector 15 possessed just a single coefficient equal to 1. In this case, detecting the most likely sequence then amounts to minimizing the metric (9) below with respect to all the possible sequences j:

$$\min_j M_n(j) = \sum_{k=0}^{n} \left| r_{1,k} - \sum_{l=0}^{L_i} h_{1,l} d_{k-l}^{(j)} \right|^2 + \left| r_{2,k} - \sum_{l=0}^{L_i} h_{2,l} d_{k-l}^{(j)} \right|^2 + \gamma \left| \tilde{d}_k - d_k^{(j)} \right|^2 \qquad (9)$$

where γ is a positive coefficient and dk the estimated data item obtained from the output of the channel decoder of a previous module, and which is easily calculated on the model of the process set forth in FR 2 730 370.

The output from the detector 15 provides a likelihood ratio logarithm from which is subtracted the estimated data item $d_k$ multiplied by the coefficient γ as in FR 2 730 370. The extrinsic value obtained feeds the input of the channel decoder 20 with weighted input and output (FIG. 3). The output of the channel decoder 20 provides the estimated data that will be used by the next module to improve the performance of its detector 15. It will be noted that, for the first iteration (p=1), the estimated data are not known and are regarded as zero values.

The manner in which the coefficients of the filters $H_1(z)$ and $H_2(z)$ are determined in practice and the manner in which the weighted outputs of the detector and of the channel decoder are obtained are in themselves well known. Reference may be made in particular to FR 2 730 370.

To illustrate the manner of operation of the MCTD, we have considered the two channels $H_1$ and $H_2$ described previously.

The coefficients of H1 and H2 are assumed to be known to the receiver. For the simulations, the transmission chain depicted in FIG. 1b has been considered together with an interleaving of size 256×256 and the transmitting of more than 1 million binary elements. Channel coding is carried out by a rate ½ convolutional coder with octal generating polynomials (23, 35).

Figure 8:
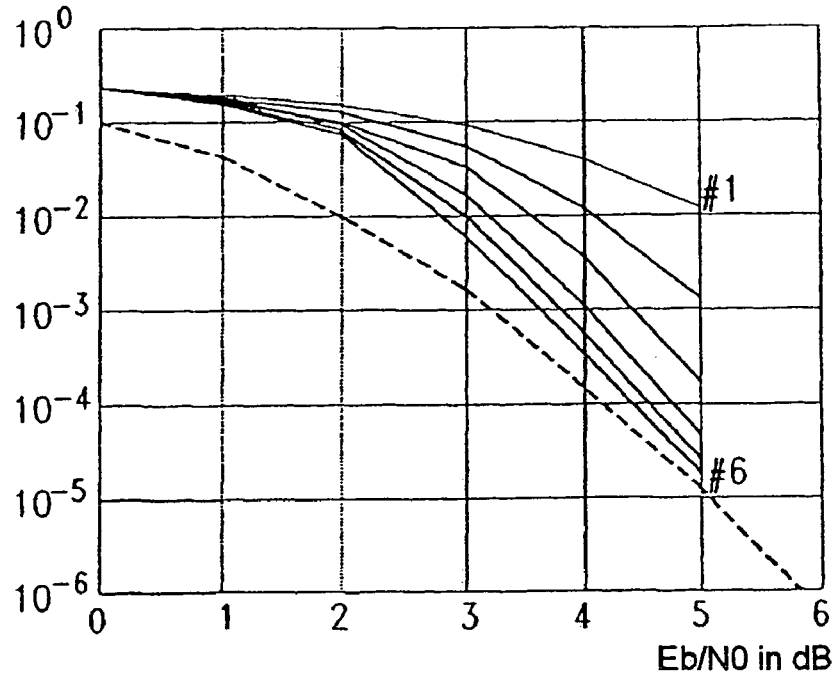
FIG. 8 is a graph which gives the binary error rate after channel decoding as a function of the ratio Eb/N0 and which illustrates performance of a device of the type of that represented in FIGS. 2, 3, and 6 for an PM2 modulation on a multi-channel pathway.

The performance of the MCTD is represented in FIG. 8. The dashed curve represents the performance obtained on the frequency unselective Gaussian channel with coding and the solid curves the performance obtained at the output of the MCTD for various iterations.

These results show that the MCTD is very efficient in combating inter-symbol interference and rivals the performance of the frequency unselective Gaussian channel when the signal-to-noise ratio exceeds a few dB.

The devices just described advantageously find application in any multi-channel receiver for a system for digital communication on frequency-selective channels possessing (convolutional or block) channel coding and interleaving.

Two distinct structures have been proposed. The first structure (MCTE) makes it possible to equalize transmission pathways possessing long impulse responses for transmissions by modulations with a large number of states. The second structure (MCTD) is better suited to modulations with a small number of states for transmission pathways with small temporal dispersion.

The invention is applicable to any transmission system using linear modulations such as phase modulations (PM), amplitude modulations on quadrature carriers (QAM), modulations associated with a differential coding, trellis-coded modulations (TCM) and nonlinear modulations that can be decomposed into sums of linear modulations (GMSK, CPM, . . . ).

REFERENCES

[1] C. Berrou, A. Glavieux, P. Thitimajshima, "Near Shannon limit error-correcting coding and decoding: turbo codes", Proc ICC 93, pp. 1064-1070, Geneva, Switzerland, May 1993. Turbo-codes.

[2] C. Douillard, A. Glavieux, M. Jezequel, C. Berrou "Dispositif de réception de signaux numériques à structure itérative, module et procédés correspondants" [Device for receiving digital signals with iterative structure, corresponding module and processes], France Télécom and TDF patent No. 9501603, February 1995.

[3] C. Laot, A. Glavieux and J. Labat, "Dispositif d'égalisation et de décodage pour un canal de transmission numérique sélectif en fréquence" [Equalization and decoding device for a frequency selective digital transmission channel], France Télécom patent No. 9705978, May 1997.

[4] G. Bauch, H. Khorram and J. Hagenauer, "Iterative Equalization and Decoding in Mobile Communications Systems", in Proc; EPMC'97, Bonn, Germany, September/October 1997, pp. 307-312.

[5] Nefedov, Nikolai, "Method and apparatus for channel coding and decoding for modulation schemes and memory", European Patent Application 99306051.6, Date of filing Jul. 29, 1999.

[6] V. Franz, G. Bauch, "Turbo-detection for enhanced Data for GSM Evolution", VTC 99, pp. 2954-2958, vol. 5.

[7] P. Strauch et al., "Turbo-Equalization for an 8-PSK Modulation Scheme in a Mobile TDMA Communication System", VTC 99, pp. 1605-1609, vol. 3.

[8] M. Tuchler, R. Kötter, A. C. Singer, "Iterative Correction of ISI via Equalization and Decoding with Priors", ISIT 2000, Sorrento, Italy, Jun. 25, 2000.

The invention claimed is:

1. A channel equalization and decoding device in a context of multi-channel reception comprising:
a series of modules each including
a decoder (20) with weighted outputs, a module of rank p=1 receives a string of samples emanating from a sensor and each module of rank p greater than 1 receives, on the one hand, said string of samples emanating from the sensor and delayed by a quantity equal to the processing time of the previous modules of rank 1 to p−1, and, on the other hand, the output of the previous module of rank 1 to p−1,
wherein the module of rank 1 further receives at least one other string emanating from another sensor and the modules of rank p greater than 1 receive said at least one other string of samples emanating from the other sensor and delayed by a quantity equal to the processing time of the modules of rank 1 to p−1, the at least two strings of samples being different and a multi-channel equalizer to determine one and the same equalized string of samples by utilizing the at least two strings received as two unequalized different representations of a string of samples to be determined.

2. The device as claimed in claim 1, wherein the equalizer of each module comprises means for implementing two different equalization processings on respectively the at least two strings received.

3. The device as claimed in claim 1 or claim 2, wherein each module of the series of modules comprises:
the equalizer including a detector with weighted outputs and inputs (15) and a bank of filters (14) placed so as to each be fed with a string of samples from among said at least two strings of samples received,
the detector (15) receiving, on the one hand, the outputs from the filters (14) and, on the other hand, at least one output from the previous module in respect of the modules of rank greater than 1.

4. The device as claimed in claim 1, wherein the decoder (20) is a channel decoder with M-ary weighted outputs and inputs including five functions that are either a symbol to binary converter SBC (22), a deinterleaving function (23), a decoding function with binary weighted outputs and inputs (24), an interleaver (25) and a binary to symbol converter BSC (26).

5. The device as claimed in claim 4, wherein each module comprises a deinterleaver (23) between the SBC (22) and the decoder (24), and an interleaver (25) between the decoder (24) and the BSC (26).

6. The device as claimed in claim 4, wherein each module comprises a symbol to binary converter (22) between the deinterleaver (23) and the decoder (24) and a binary to symbol converter BSC (26) between the decoder (24) and the interleaver (25).

7. The device as claimed in claim 4, wherein the SBC (22) integrates a trellis-coded modulation.

8. A channel equalization and decoding device comprising:
a series of modules each including a decoder with weighted outputs, a module of rank p=1 receives a string of samples emanating from a sensor and whose modules of rank p greater than 1 receive, on the one hand, the string of samples emanating from the sensor and delayed by a quantity equal to the processing time of the previous modules, and, on the other hand, the output of the previous module
wherein the module of rank 1 further receives at least one other string emanating from another sensor and the modules of rank p greater than 1 receive said at least one other string of samples emanating from the other sensor and delayed by a quantity equal to the processing time of the modules of rank 1 to p−1, the at least two strings of samples being different and an equalizer to determine one and the same equalized string of samples by utilizing the at least two strings received as two unequalized different representations of the string of samples to be determined, the equalizer (10) of each module comprises:
a bank (11) of at least two transverse filters fed respectively with said at least two sample strings received,
an adder (12) placed downstream of the filter bank (11),
another transverse filter (13) fed by an output of the previous module, and
means for subtracting a sample string obtained from the output of the adder to a sample string obtained from the output of the other transverse filter.

9. The device as claimed in claim 8, wherein the sample string outputted from said other transverse filter (13) represents at least partially the interference present at the output of the adder.

10. The device as claimed in claim 8, wherein the module of rank 1 comprises means for feeding its said other transverse filter (13) with data tapped off or decided at the output of the equalizer (10) of this same module.

* * * * *

UNITED STATES PATENT AND TRADEMARK OFFICE
CERTIFICATE OF CORRECTION

PATENT NO. : 7,561,647 B2
APPLICATION NO. : 10/471139
DATED : July 14, 2009
INVENTOR(S) : Christophe Laot and Joel Labat It is certified that error appears in the above-identified patent and that said Letters Patent is hereby corrected as shown below:

On the Title Page, in Item 73, under Assignees, at line 2, please delete "Eccles" and insert --Ecoles--.

On the Title Page, in Item 73, under Assignees, at line 3, please delete "Brentagne" and insert --Bretagne--.

Signed and Sealed this
Ninth Day of August, 2011

David J. Kappos
*Director of the United States Patent and Trademark Office*